(12) United States Patent
Yoshida et al.

(10) Patent No.: US 11,098,819 B2
(45) Date of Patent: Aug. 24, 2021

(54) VALVE DEVICE, FLOW CONTROL METHOD USING THE SAME, AND SEMICONDUCTOR MANUFACTURING METHOD

(71) Applicant: FUJIKIN INCORPORATED, Osaka (JP)

(72) Inventors: Toshihide Yoshida, Osaka (JP); Tomohiro Nakata, Osaka (JP); Tsutomu Shinohara, Osaka (JP); Toshiyuki Inada, Osaka (JP); Takashi Funakoshi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 74 days.

(21) Appl. No.: 16/347,934

(22) PCT Filed: Nov. 2, 2017

(86) PCT No.: PCT/JP2017/039729
§ 371 (c)(1),
(2) Date: May 7, 2019

(87) PCT Pub. No.: WO2018/088326
PCT Pub. Date: May 17, 2018

(65) Prior Publication Data
US 2019/0285176 A1    Sep. 19, 2019

(30) Foreign Application Priority Data
Nov. 8, 2016    (JP) .............................. JP2016-218093

(51) Int. Cl.
*F16K 31/122*    (2006.01)
(52) U.S. Cl.
CPC ............................. *F16K 31/1225* (2013.01)

(58) Field of Classification Search
CPC ............... F16K 31/1225; F16K 31/007; F16K 31/1221; F16K 7/17
See application file for complete search history.

(56) References Cited

U.S. PATENT DOCUMENTS 5,092,360 A    3/1992  Watanabe et al.
8,783,652 B2 *  7/2014  Dinh ................. H01L 21/02104
                                                251/129.06
(Continued)

FOREIGN PATENT DOCUMENTS

EP            1975485      10/2008
JP         8-170755 A       7/1996
(Continued)

OTHER PUBLICATIONS

Search Report from Korea Patent Office issued in Korean Appl. No. KR20197015535, dated Jul. 31, 2020.
(Continued)

*Primary Examiner* — Eric Keasel
(74) *Attorney, Agent, or Firm* — Greenblum & Bernstein, P.L.C.

(57) ABSTRACT

A valve device that greatly reduces man-hours for flow adjustment includes a valve body that defines a flow path, a valve element provided so as to be capable of opening and closing the flow path of the valve body, an operation member that operates the valve element and is moveably provided between a closed position where the valve element closes the flow path and an open position where the valve element opens the flow path, set in advance, in opening and closing directions that allow the valve element to open and close the flow path, a main actuator that moves the operation member in the opening direction, and a piezoelectric actuator for adjusting a position of the operation member positioned in the open position.

13 Claims, 9 Drawing Sheets

(56) References Cited

U.S. PATENT DOCUMENTS

| | | |
|---|---|---|
| 2001/0038083 A1 | 11/2001 | Sakurai |
| 2002/0017833 A1 | 2/2002 | Montuschi et al. |
| 2005/0253100 A1 | 11/2005 | Yasue et al. |
| 2010/0127196 A1 | 5/2010 | Sawada et al. |
| 2013/0000759 A1 | 1/2013 | Killeen et al. |
| 2013/0233395 A1 | 9/2013 | Dinh et al. |

FOREIGN PATENT DOCUMENTS

| | | |
|---|---|---|
| JP | 10-318385 | 12/1998 |
| JP | 2007-64333 A | 3/2007 |
| JP | 2016-121776 A | 7/2016 |
| KR | 10-0812560 B1 | 3/2008 |
| KR | 10-2009-0088943 A | 8/2009 |
| WO | 2004/079243 A1 | 9/2004 |
| WO | 2018/235900 | 12/2018 |
| WO | 2019/059040 | 3/2019 |
| WO | 2019/059043 | 3/2019 |

OTHER PUBLICATIONS

Official Communication issued in International Bureau of WIPO Patent Application No. PCT/JP2017/039729, dated Jan. 30, 2018.
Official Communication issued in European Patent Office (EPO) Patent Application No. 17869179.6, dated Oct. 30, 2019.
European Official Action issued in Application No. 17 869 179.6, dated Apr. 1, 2021.
Singapore Written Opinion issued in Application No. 11201903992T, dated Jan. 19, 2021.

* cited by examiner

VALVE DEVICE, FLOW CONTROL METHOD USING THE SAME, AND SEMICONDUCTOR MANUFACTURING METHOD

FIELD OF THE INVENTION

The present invention relates to a valve device, a flow control method using this valve device, and a semiconductor manufacturing method.

DESCRIPTION OF THE BACKGROUND ART

In a semiconductor manufacturing process, a fluid control system called an integrated gas system in which various fluid control devices, such as a switch valve, a regulator, and a mass flow controller, are integrated is used to supply an accurately measured process gas to a processing chamber. A box that houses this integrated gas system is called a gas box.

While normally a process gas output from the gas box described above is directly supplied to the processing chamber, in a treatment process that deposits a film on a substrate by atomic layer deposition (ALD), in order to supply a process gas in a stable manner, the process gas supplied from the gas box is temporarily stored in the tank as a buffer, and a valve provided close to the processing chamber is opened and closed at high frequency, supplying the process gas from the tank to the processing chamber in a vacuum atmosphere. Note that, for examples of the valve provided close to the processing chamber, refer to Patent Documents 1 and 2.

The ALD is one type of chemical vapor deposition, and a method in which, under film depositing conditions such as temperature and time, two or more types of process gases are allowed to alternately flow on the substrate surface, one type at a time, and caused to react with atoms on the substrate surface, resulting in the deposition of films, one layer at a time. This method allows control per atom layer, making it possible to form a uniform film thickness and grow the film very finely, even in terms of film quality.

In the semiconductor manufacturing process based on the ALD method, the flow rate of the process gas needs to be precisely adjusted and a certain amount of flow rate needs to be secured by increasing a size of a diameter of the substrate or the like.

PATENT DOCUMENTS

Patent Document 1: Japanese Laid-Open Patent Application No. 2007-64333
Patent Document 2: Japanese Laid-Open Patent Application No. 2016-121776

SUMMARY OF THE INVENTION

Problems to be Solved by the Invention

Nevertheless, in an air driven valve, it is not easy to precisely adjust the flow rate by pneumatic adjustment or mechanical adjustment. Further, in a semiconductor manufacturing process based on ALD method, the area around the processing chamber becomes high in temperature, and thus the valve is readily affected by temperature. Furthermore, the valve is opened and closed at high frequency, and thus the valve readily ages and changes over time, requiring significant man-hours for the flow adjustment task.

An object of the present invention is to provide a valve device capable of precisely adjusting a flow rate of a fluid while securing the flow rate.

Another object of the present invention is to provide a valve device capable of greatly reducing flow adjustment man-hours.

Yet another object of the present invention is to provide a valve device capable of immediately executing flow adjustment.

Yet another object of the present invention is to provide a flow control method that uses the valve device described above, a flow control system, a semiconductor manufacturing system, and a semiconductor manufacturing method.

Means for Solving the Problems

A valve device according to the present invention comprises:
a valve body that defines a flow path;
a valve element capable of opening and closing a flow path of the valve body;
an operation member that operates the valve element and is moveably provided between a closed position where the valve element closes the flow path and an open position where the valve element opens the flow path, set in advance, in opening and closing directions that allow the valve element to open and close the flow path;
a main actuator that moves the operation member to the open position or the closed position; and
an adjusting actuator for adjusting a position of the operation member positioned in the open position.

Preferably, a configuration can be adopted in which the main actuator moves the operation member to the open position, and the adjusting actuator adjusts the position of the operation member, that has been positioned in the open position by the main actuator, in the opening and closing directions.

More preferably, a configuration can be adopted in which the adjusting actuator is disposed in a predetermined position with respect to the valve body, and adjusts the position of the operation member, that has reached the target position, in the opening and closing direction while receiving a force acting on the operation member, at a tip portion of the adjusting actuator to regulate the movement of the operation member.

More preferably, a configuration can be adopted in which the adjusting actuator adjusts the position of the operation member in the opening and closing directions by expansion and contraction of a total length from the tip portion to a base end portion in the opening and closing directions. A configuration can be adopted in which the adjusting actuator includes an actuator that utilizes expansion and contraction of the piezoelectric element, more preferably comprises a case provided with a base end portion and a tip portion in the opening and closing directions, and a piezoelectric element housed in the case and stacked between the base end portion and the tip portion, and expands and contracts a total length between the base end portion and the tip portion of the case using expansion and contraction of the piezoelectric element.

A flow control method of the present invention controls a flow rate of a fluid using the above-described valve device, and operates an adjusting actuator while securing the flow rate by a stroke of a main actuator, making precise flow control possible.

A semiconductor manufacturing method of the present invention comprises a step of using the valve device described above for flow control of a process gas in a manufacturing process of a semiconductor device that requires a treatment process by the process gas in a sealed chamber.

A fluid control system of the present invention is a fluid control system comprising:
a plurality of fluid devices, wherein:
the fluid devices include the valve device having the above-described configuration.

A semiconductor manufacturing system of the present invention includes the valve device having the above-described configuration for control of a process gas in a manufacturing process of a semiconductor device that requires a treatment process by the process gas in a sealed chamber.

Effect of the Invention

According to the present invention, a valve device comprises an adjustment actuator in addition to a main actuator, making precise flow adjustment possible and greatly reducing flow adjustment man-hours.

According to the present invention, the main actuator and the adjustment actuator are selected as appropriate, making a required degree of opening of valve achievable and precise flow control possible.

According to the present invention, flow adjustment and flow control are possible when an instruction is provided to the adjustment actuator, making it possible to immediately adjust and, in real-time, control the flow rate using the adjusting actuator.

DESCRIPTION OF THE PREFERRED EMBODIMENTS

Figure 1:
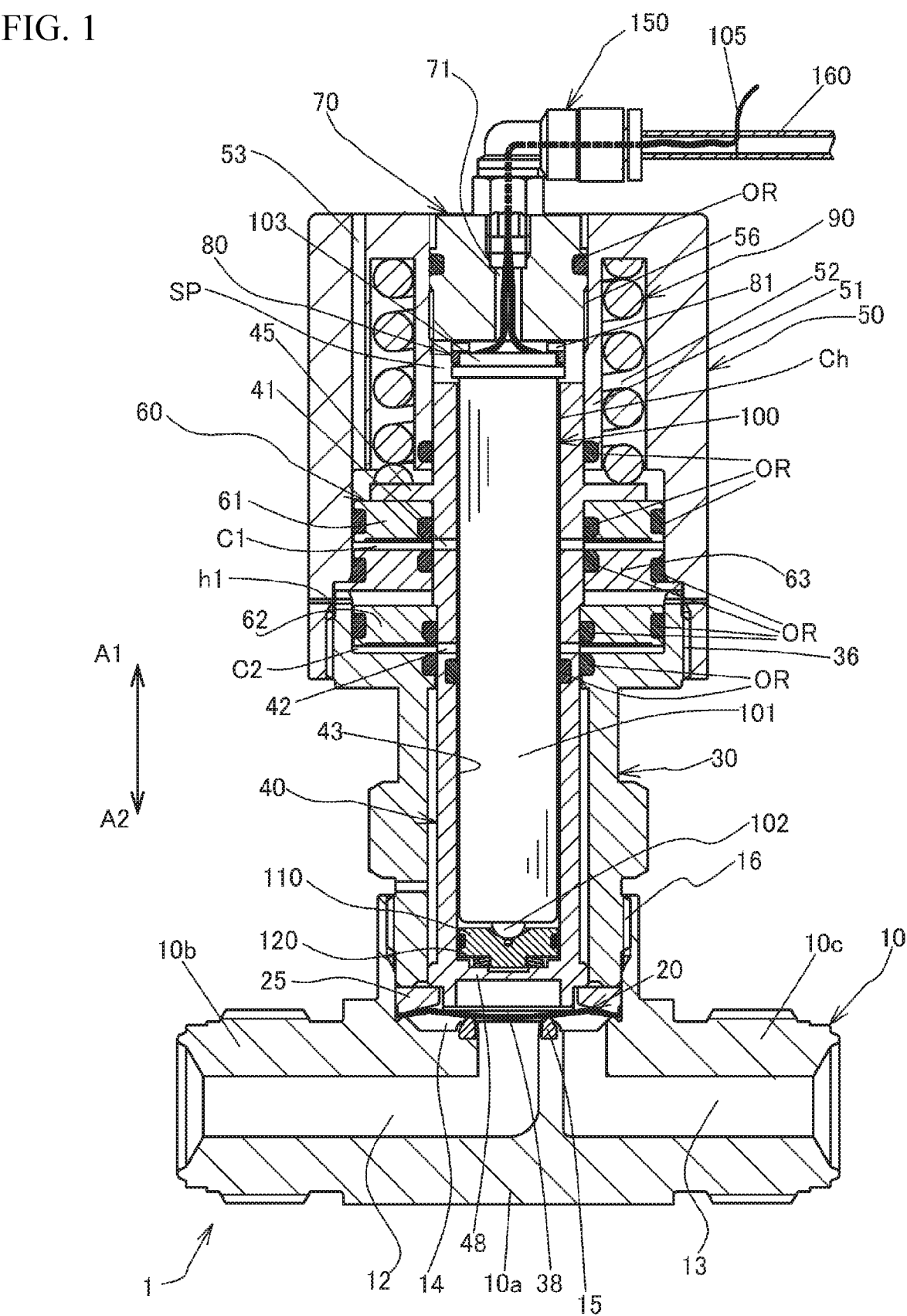
FIG. 1 is a longitudinal sectional view of a valve device according to an embodiment of the present invention.

Embodiments of the present invention are described below with reference to the drawings. Note that, in this specification and the drawings, components having substantially the same function are denoted using the same reference numeral, and duplicate descriptions thereof are omitted.

Figure 2:
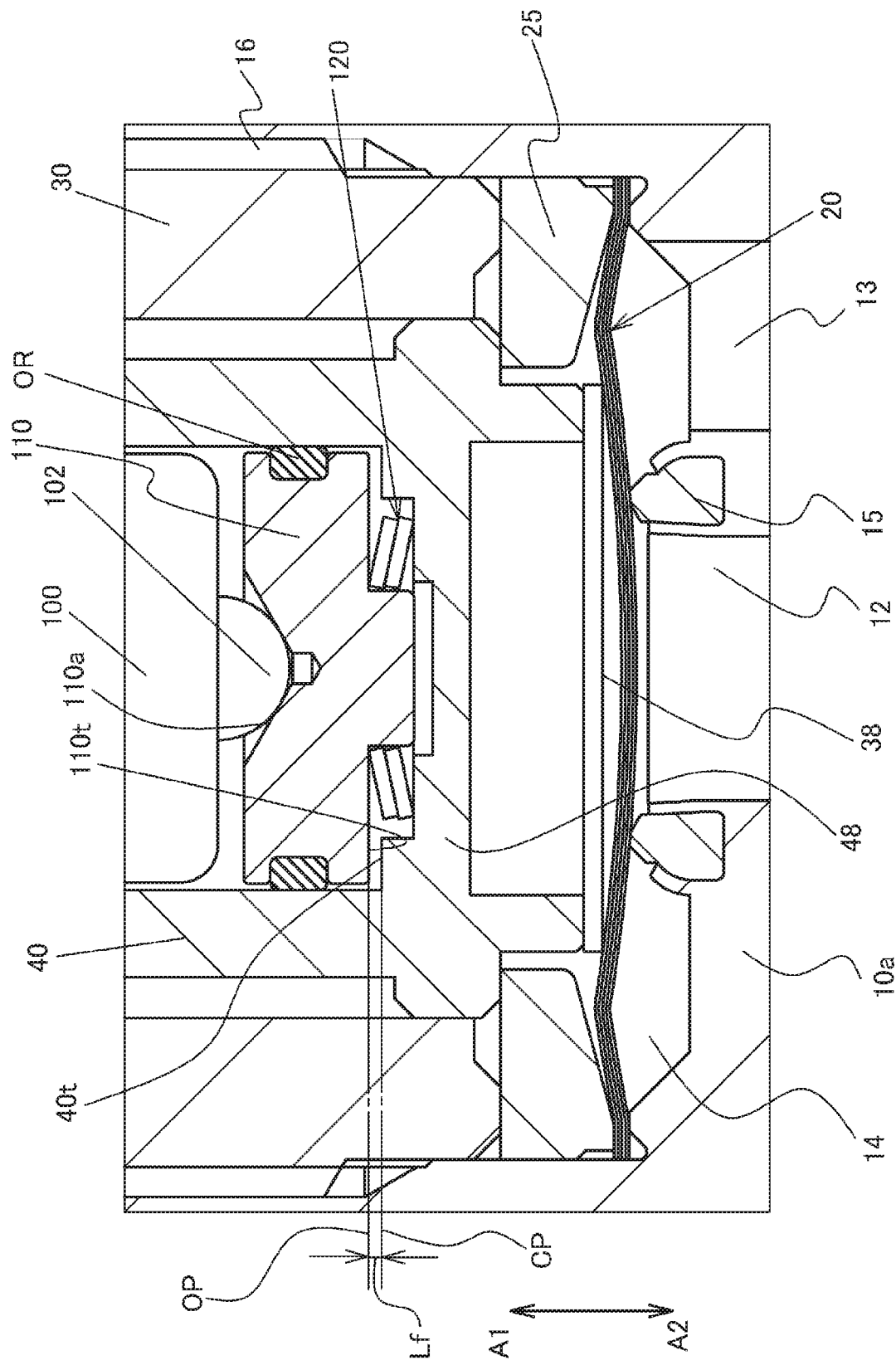
FIG. 2 is an enlarged sectional view of a main part of the valve device in FIG. 1, in a closed state.
Figure 3:
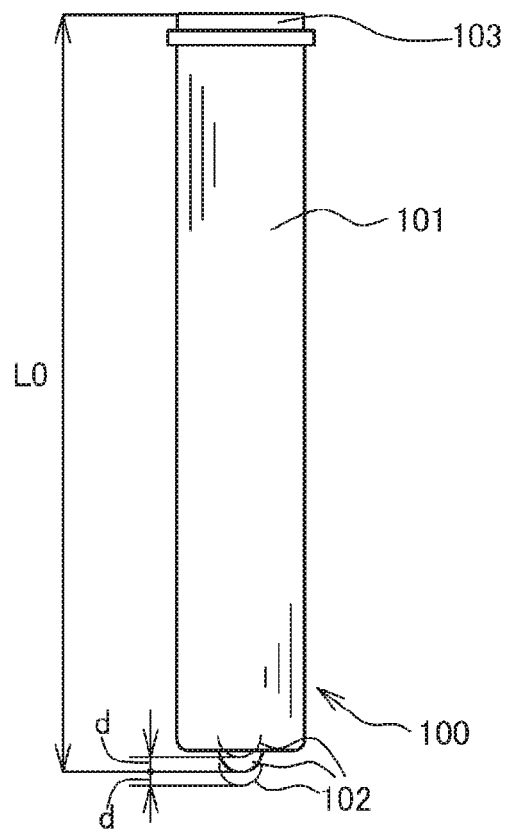
FIG. 3 is an explanatory drawing illustrating an operation of a piezoelectric actuator.

FIG. 1 is a drawing illustrating a configuration of a valve device according to an embodiment of the present invention, and shows the state when the valve is fully closed, FIG. 2 is an enlarged sectional view of main parts in FIG. 1, and FIG. 3 is a drawing for explaining an operation of a piezoelectric actuator as an adjusting actuator. It should be noted that, in the explanations below, an upward direction is denoted as an opening direction A1, and a downward direction is denoted as a closing direction A2.

In FIG. 1, 1 denotes a valve device, 10 denotes a valve body, 20 denotes a diaphragm as a valve element, 38 denotes a diaphragm presser, 30 denotes a bonnet, 40 denotes an operation member, 50 denotes casing, 60 denotes a main actuator, 70 denotes an adjustment body, 80 denotes an actuator presser, 90 denotes a coil spring, 100 denotes a piezoelectric actuator as an adjusting actuator, 110 denotes an actuator receiver, 120 denotes a disc spring as an elastic member, and OR denotes an O-ring as a seal member.

The valve body 10 is formed of stainless steel, comprises a valve body main unit 10a having a block shape, and connecting parts 10b, 10c respectively protruding from the sides of the valve body main unit 10a, and defines flow paths 12, 13. One end of each of the flow paths 12, 13 opens at a respective end surface of the connecting parts 10b, 10c, and the other end communicates with a valve chamber 14 having a recessed shape opening upward. On a bottom surface of the valve chamber 14, a valve seat 15 made of a synthetic resin (such as perfluoroalkoxy alkane (PFA), polyamide (PA), polyimide (PI), or polychlorotrifluoroethylene (PCTFE)) is fitted and fixed to a mounting groove provided to an opening peripheral edge on the other end side of the flow path 12. Note that, in this embodiment, as is clear in FIG. 2, the valve seat 15 is fixed in the mounting groove by swaging.

The diaphragm 20 is a valve element provided so as to be capable of opening and closing the flow paths 12, 13 of the valve body 10, is arranged above the valve seat 15, holds an air-tightness of the valve chamber 14, and opens and closes the flow paths 12, 13 by a center portion thereof moving up and down and being brought into contact with and separating from the valve seat 15. In this embodiment, the diaphragm 20, formed by swelling center portions of a thin plate made of a metal such as special stainless steel, and a nickel and cobalt alloy thin plate upward, has a spherical shell shape in which an upwardly convex arc shape is the natural state. The diaphragm 20 is configured by laminating three special stainless steel thin plates, and one nickel and cobalt alloy thin plate.

The diaphragm 20 is mounted on a protruding portion of an inner peripheral surface of the valve chamber 14 at the peripheral edge portion thereof, and by screwing a lower end portion of the bonnet 30 inserted into the valve chamber 14 into a thread part 16 of the valve body 10, the diaphragm 20 is pressed to the protruding portion side of the valve body 10 via a pressing adapter 25 made of a stainless alloy, and fixed in an airtight state. Note that the nickel and cobalt alloy thin film is disposed on a contact gas side.

It should be noted that a diaphragm having another configuration can also be used.

The operation member 40 is a member for operating the diaphragm 20 so as to make the diaphragm 20 open and close the flow paths 12, 13, and is formed into a substantially cylindrical shape, closed on a lower end side by a closing part 48, and open on an upper end side. The operation member 40 is fitted to an inner peripheral surface of the bonnet 30 and an inner peripheral surface of a tubular part 51 formed in the casing 50, and is moveably supported in an up-down direction. Note that A1, A2 indicated in FIG. 1 and FIG. 2 are opening and closing directions of the operation member 40, A1 denotes the opening direction and A2 denotes the closing direction. While, in this embodiment, the upward direction and the downward direction with respect to the valve body 10 are the opening direction A1 and the closing direction A2, respectively, the present invention is not necessarily limited thereto.

The diaphragm presser 38 that is made of a synthetic resin such as polyimide and comes into contact with a center upper surface of the diaphragm 20, is mounted on the lower end surface of the operation member 40.

The coil spring 90 is provided between an upper surface of a flange part 45 formed on an outer peripheral surface of the operation member 40 and a ceiling surface of the casing, and the operation member 40 is continually pressed in the closing direction A2 by the coil spring 90. Thus, as illustrated in FIG. 2, with the main actuator 60 not activated, the diaphragm 20 is pressed against the valve seat 15, and the area between the flow paths 12, 13 is closed.

Note that the flange part 45 may be integrated with or separated from the operation member 40.

The coil spring 90 is housed in a holding part 52 formed between an inner peripheral surface of the casing 50 and the tubular part 51. While the coil spring 90 is used in this embodiment, the present invention is not necessarily limited thereto, and other types of springs can be used, such as a disc spring or a leaf spring.

The casing 50 is fixed to the bonnet 30 by screwing a lower end inner periphery thereof into a thread part 36 formed in an upper end outer periphery of the bonnet 30. Note that a bulkhead 63 having an annular shape is fixed between an upper end surface of the bonnet 30 and the casing 50.

Cylinder chambers C1, C2 vertically divided by the bulkhead 63 are formed between the outer peripheral surface of the operation member 40, and the casing 50 and the bonnet 30.

A piston 61 formed into an annular shape is fitted and inserted into the cylinder chamber C1 on an upper side, and a piston 62 formed into an annular shape is fitted and inserted into the cylinder chamber C2 on a lower side. These cylinder chambers C1, C2 and pistons 61, 62 constitute the main actuator 60 in which the operation member 40 is moved in the opening direction A1. The main actuator 60 increases the area on which pressure acts by using the two pistons 61, 62, making it possible to boost the force resulting from the operation gas.

A space on the upper side of the piston 61 of the cylinder chamber C1 communicates with the atmosphere by a ventilation path 53. A space on the upper side of the piston 62 of the cylinder chamber C2 communicates with the atmosphere by a ventilation path h1.

The spaces on the lower sides of the pistons 61, 62 of the cylinder chambers C1, C2, due to the supply of high pressure operation gas, are kept airtight by the O-rings OR. These spaces are respectively communicate with flow channels 41, 42 formed in the operation member 40. The flow channels 41, 42 communicate with a flow channel Ch formed between the inner peripheral surface of the operation member 40 and an outer peripheral surface of a case main body 101 of the piezoelectric actuator 100, and this flow channel Ch communicates with a space SP formed by an upper end surface of the operation member 40 and the tubular part 51 of the casing 50 and a lower end surface of the adjustment body 70. Then, a flow channel 81 formed in the actuator presser 80 having an annular shape connects the space SP and a flow channel 71 that passes through a central portion of the adjustment body 70. The flow channel 71 of the adjustment body 70 communicates with a pipe 160 via a pipe joint 150.

The piezoelectric actuator 100 includes piezoelectric elements (not illustrated) stacked on the case main body 101 having a cylindrical shape and illustrated in FIG. 3. The case main body 101 is made of a metal such as stainless alloy, and is closed on an end surface on a tip portion 102 side having a hemispherical shape, and on an end surface on a base end portion 103 side. Voltage is applied to the stacked piezoelectric elements, causing expansion, thereby elastically deforming the end surface on the tip portion 102 side of the case main body 101, and displacing the tip portion 102 having a hemispherical shape in the longitudinal direction. Given 2d as a maximum stroke of the stacked piezoelectric elements, a predetermined voltage V0 in which an expansion of the piezoelectric actuator 100 becomes d is applied in advance, bringing a total length of the piezoelectric actuator 100 to L0. Then, when a voltage higher than the predetermined voltage V0 is applied, the total length of the piezoelectric actuator 100 becomes L0+d at a maximum and, when a voltage lower than the predetermined voltage V0 (including no voltage) is applied, the total length of the piezoelectric actuator 100 becomes L0−d at a minimum. Accordingly, the total length from the tip portion 102 to the base end portion 103 can be expanded and contracted in the opening and closing directions A1, A2. Note that, while the tip portion 102 of the piezoelectric actuator 100 has a hemispherical shape in this embodiment, the shape is not necessarily limited thereto, and the tip portion may be a flat surface.

As illustrated in FIG. 1, electric power is supplied to the piezoelectric actuator 100 by a wiring 105. The wiring 105 is led to the pipe 160 through a flow channel 71 of the adjustment body 70 and the pipe joint 150, and is drawn outside from the middle of the pipe 160.

The position of the base end portion 103 in the opening and closing directions of the piezoelectric actuator 100 is regulated by a lower end surface of the adjustment body 70 via the actuator presser 80. In the adjustment body 70, a thread part provided in an outer peripheral surface of the adjustment body 70 is screwed into a screw hole 56 formed in an upper portion of the casing 50, and the position of the adjustment body 70 in the opening and closing directions A1, A2 is adjusted, making it possible to adjust the position of the piezoelectric actuator 100 in the opening and closing directions A1, A2.

The tip portion 102 of the piezoelectric actuator 100 comes into contact with a receiving surface 110a having a conical surface shape and formed on an upper surface of the actuator receiver 110 having a disc shape, as illustrated in FIG. 2. The actuator receiver 110 is moveable in the opening and closing directions A1, A2.

The disc spring 120 serving as an elastic member is provided between a lower surface of the actuator receiver 110 and an upper surface of the closing part 48 of the operation member 40. In the state illustrated in FIG. 2, the disc spring 120 is already compressed and elastically deformed to a certain degree and, by a restoring force of this disc spring 120, the actuator receiver 110 is continually pressed in the opening direction A1. Accordingly, the piezoelectric actuator 100 is also continually pressed in the opening direction A1, and an upper surface of the base end portion 103 is pressed by the actuator presser 80. As a result, the piezoelectric actuator 100 is disposed in a predetermined position with respect to the valve body 10. The piezoelectric actuator 100 is not coupled to any member, and thus is relatively moveable in the opening and closing directions A1, A2, with respect to the operation member 40.

The number and orientation of the disc springs 120 can be changed as appropriate in accordance with conditions. Further, while an elastic member other than the disc spring 120, such as a coil spring or a leaf spring, can be used, use of the disc spring offers advantages of easy adjustment of spring rigidity, stroke, and the like.

As illustrated in FIG. 2, with the diaphragm 20 being in contact with the valve seat 15 and the valve being closed, a gap is formed between a regulating surface 110t on the lower surface side of the actuator receiver 110, and a contact surface 40t on the upper surface side of the closing part 48 of the operation member 40. A distance of this gap corresponds to a lift amount Lf of the diaphragm 20. The lift amount Lf regulates the aperture of the valve, that is, the flow rate. The lift amount Lf can be changed by adjusting the position of the adjustment body 70 described above in the opening and closing directions A1, A2. The operation member 40 in the state illustrated in FIG. 2 is positioned in a closed position CP on the basis of the contact surface 40t. When this contact surface 40t moves to a position in contact with the regulating surface 110t of the actuator receiver 110, that is, an open position OP, the diaphragm 20 separates from the valve seat 15 by the lift amount Lf.

Next, the operation of the valve device 1 having the above-described configuration will be described with reference to FIG. 4 to FIG. 6B.

Figure 4:
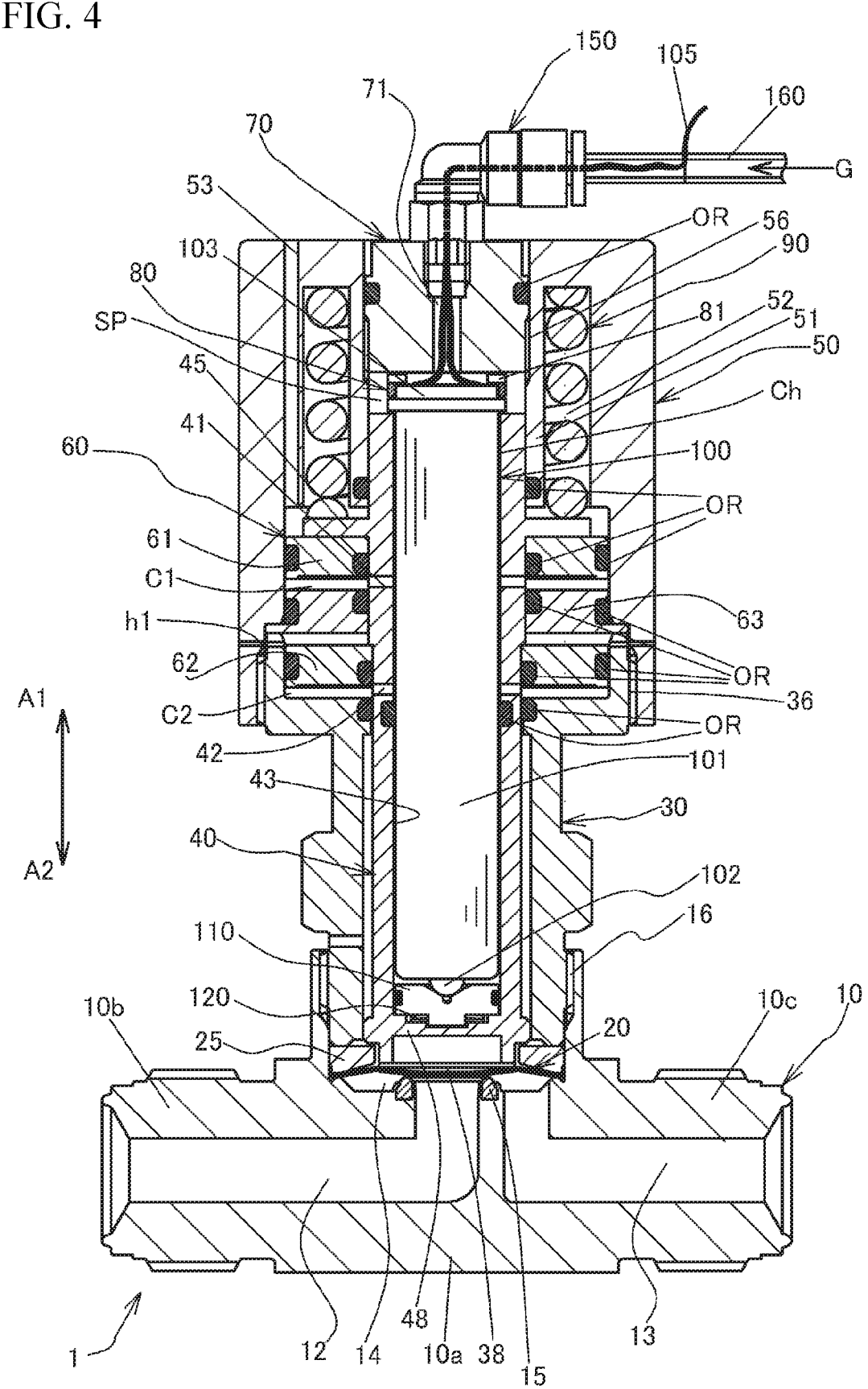
FIG. 4 is a longitudinal sectional view of the valve device in FIG. 1, in an open state.
Figure 5:
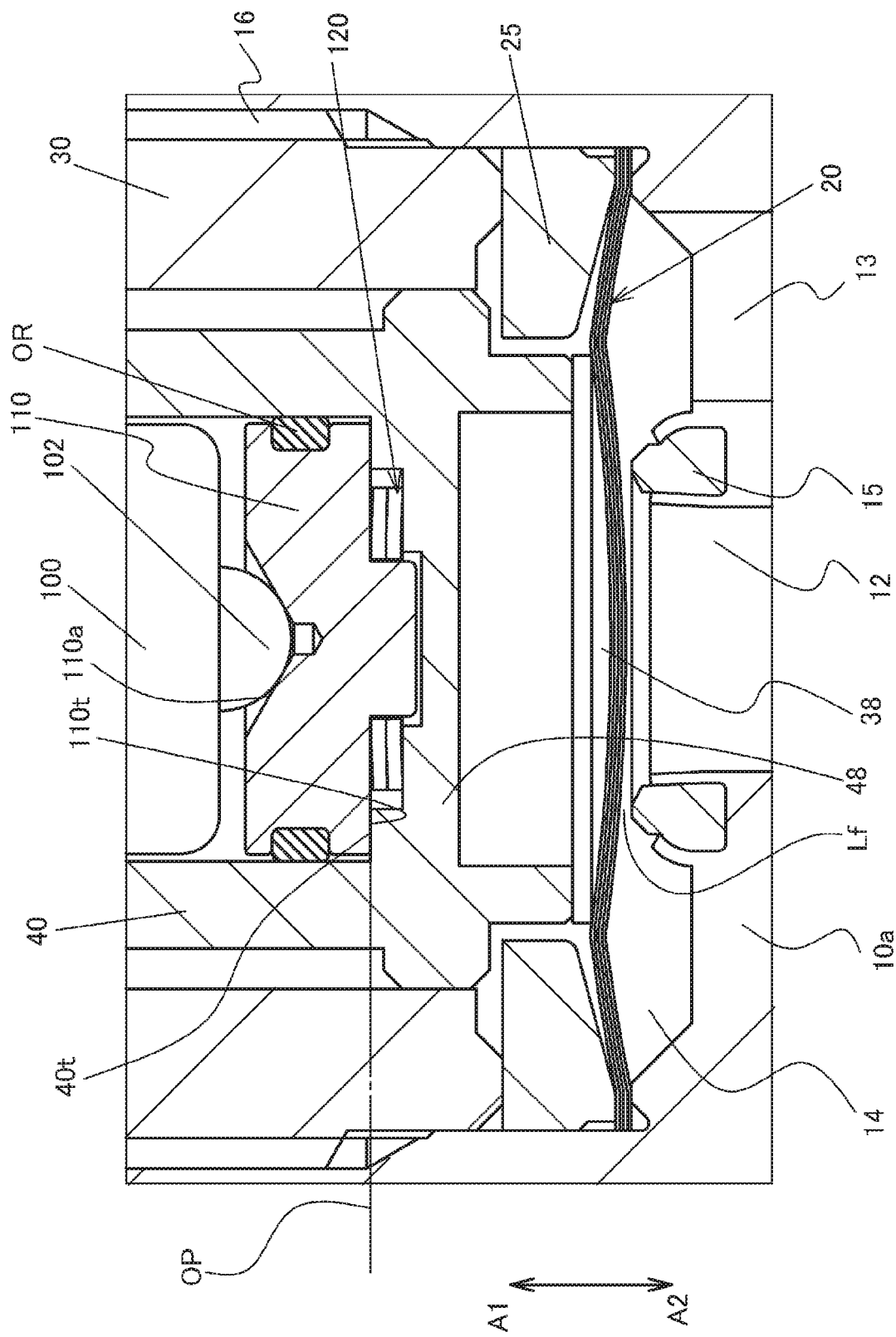
FIG. 5 is an enlarged sectional view of a main part of the valve device in FIG. 4.

As illustrated in FIG. 4, when an operation gas G having a predetermined pressure is supplied into the valve device 1 through the pipe 160, a thrust pressing up the pistons 61, 62 and the operation member 40 in the opening direction A1 acts. The pressure of the operation gas G is set to a sufficient value that allows the operation member 40 to move in the opening direction A1 against the pressing force in the closing direction A2 acting from the coil spring 90 and the disc spring 120 to the operation member 40. When such an operation gas G is supplied, as illustrated in FIG. 5, the operation member 40 moves further in the opening direction A1 while compressing the disc spring 120, the contact surface 40t of the operation member 40 comes into contact with the regulating surface 110t of the actuator receiver 110, and the actuator receiver 110 receives a force in the opening direction A1 from the operation member 40. While this force passes through the tip portion 102 of the piezoelectric actuator 100 and acts as a force that compresses the piezoelectric actuator 100 in the opening and closing directions A1, A2, the piezoelectric actuator 100 has sufficient rigidity against this force. Accordingly, the force in the opening direction A1 acting on the operation member 40 is received at the tip portion 102 of the piezoelectric actuator 100, and the movement of the operation member 40 in the A1 direction is regulated in the open position OP. In this state, the diaphragm 20 separates from the valve seat 15 by the lift amount Lf described above.

When the flow rate of the fluid output and supplied from the flow path 13 of the valve device 1 in the state illustrated in FIG. 5 is adjusted, the piezoelectric actuator 100 is activated.

Figure 6A:
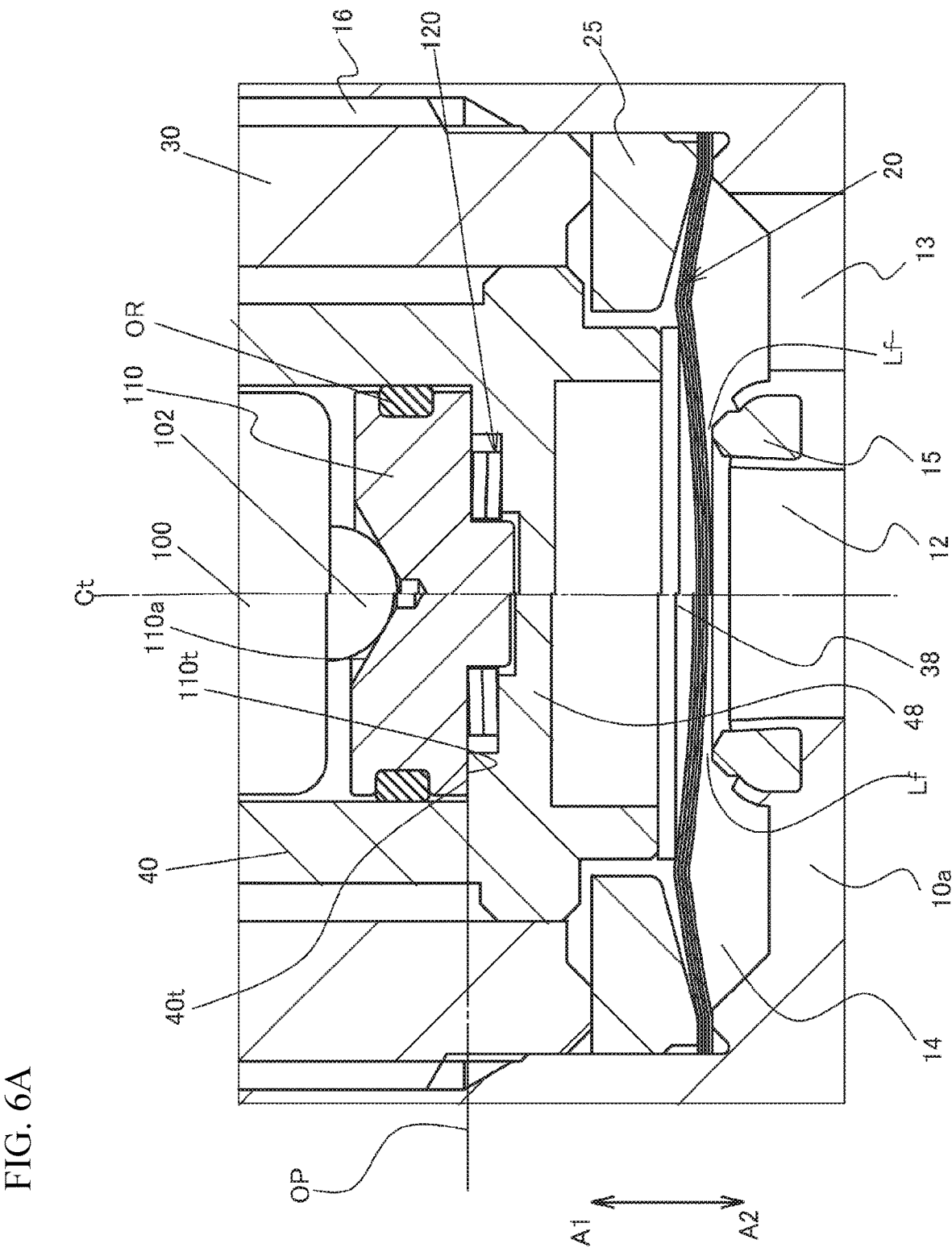
FIG. 6A is an enlarged sectional view of a main part for explaining a state during flow adjustment (during flow decrease) of the valve device in FIG. 4.
Figure 6B:
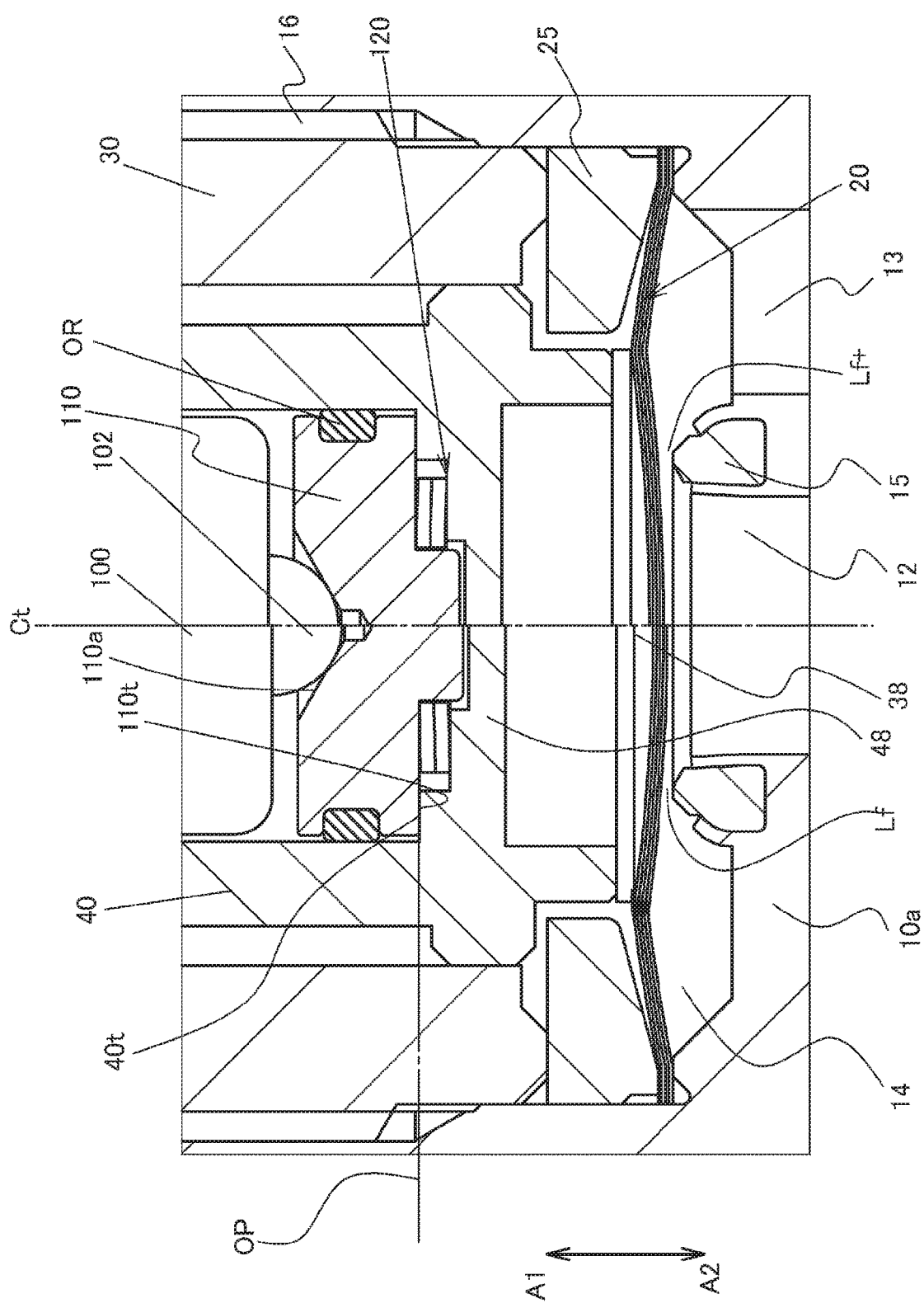
FIG. 6B is an enlarged sectional view of a main part for explaining a state during flow adjustment (during flow increase) of the valve device in FIG. 4.

In FIG. 6A and FIG. 6B, the left side of a center line Ct indicates the state illustrated in FIG. 5, and the right side of the center line Ct indicates the state after the position of the operation member 40 in the opening and closing directions A1, A2 is adjusted.

When adjustment is made in the direction that decreases the flow rate of the fluid, the piezoelectric actuator 100 is expanded and the operation member 40 is moved in the closing direction A2, as illustrated in FIG. 6A. Accordingly, a lift amount Lf− after adjustment, which is a distance between the diaphragm 20 and the valve seat 15, is less than the lift amount Lf before adjustment.

When adjustment is made in the direction that increases the flow rate of the fluid, the piezoelectric actuator 100 is contracted and the operation member 40 is moved in the opening direction A1, as illustrated in FIG. 6B. As a result, a lift amount Lf+ after adjustment, which is the distance between the diaphragm 20 and the valve seat 15, is greater than the lift amount Lf before adjustment.

In this embodiment, the maximum value of the lift amount of the diaphragm 20 is about 100 to 200 μm, and the adjustment amount by the piezoelectric actuator 100 is about ±20 μm.

That is, while the lift amount of the diaphragm 20 cannot be covered according to the stroke of the piezoelectric actuator 100, by using both the main actuator 60 and the piezoelectric actuator 100 operated by the operation gas G, it is possible to precisely adjust the flow rate using the piezoelectric actuator 100 having a relatively short stroke while securing the flow rate supplied by the valve device 1 using the main actuator 60 having a relatively long stroke, thereby eliminating the need to manually adjust the flow rate using the adjustment body 70 or the like, and thus significantly reduce flow adjustment man-hours.

According to this embodiment, precise flow adjustment is possible by simply changing the voltage applied to the piezoelectric actuator 100, making it possible to immediately adjust and, in real-time, control the flow rate.

Figure 7:
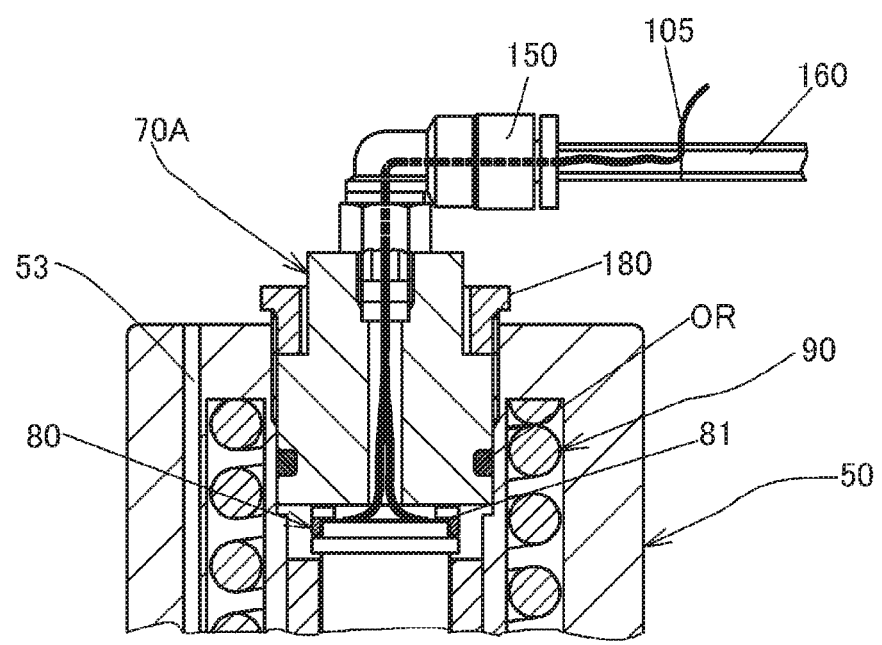
FIG. 7 is a longitudinal sectional view illustrating a modification of the valve device according to an embodiment of the present invention.

Next, FIG. 7 shows a modification of the above-described embodiment.

While the adjustment body 70 is simply screwed into the screw hole 56 of the casing 50 in the above-described embodiment, in FIG. 7, a lock nut 180 is provided on an adjustment body 70A, the lock nut 180 is screwed into the screw hole 56, and an upper surface of the adjustment body 70A is pressed by a lower surface of the lock nut 180, inhibiting the revolving of the adjustment body 70A. Defects such as shifting of the open position OP of the operation member 40 and twisting of the wiring 105 caused by rotation of the adjustment body 70A can be prevented.

Next, an application example of the valve device 1 described above will be described with reference to FIG. 8.

Figure 8:
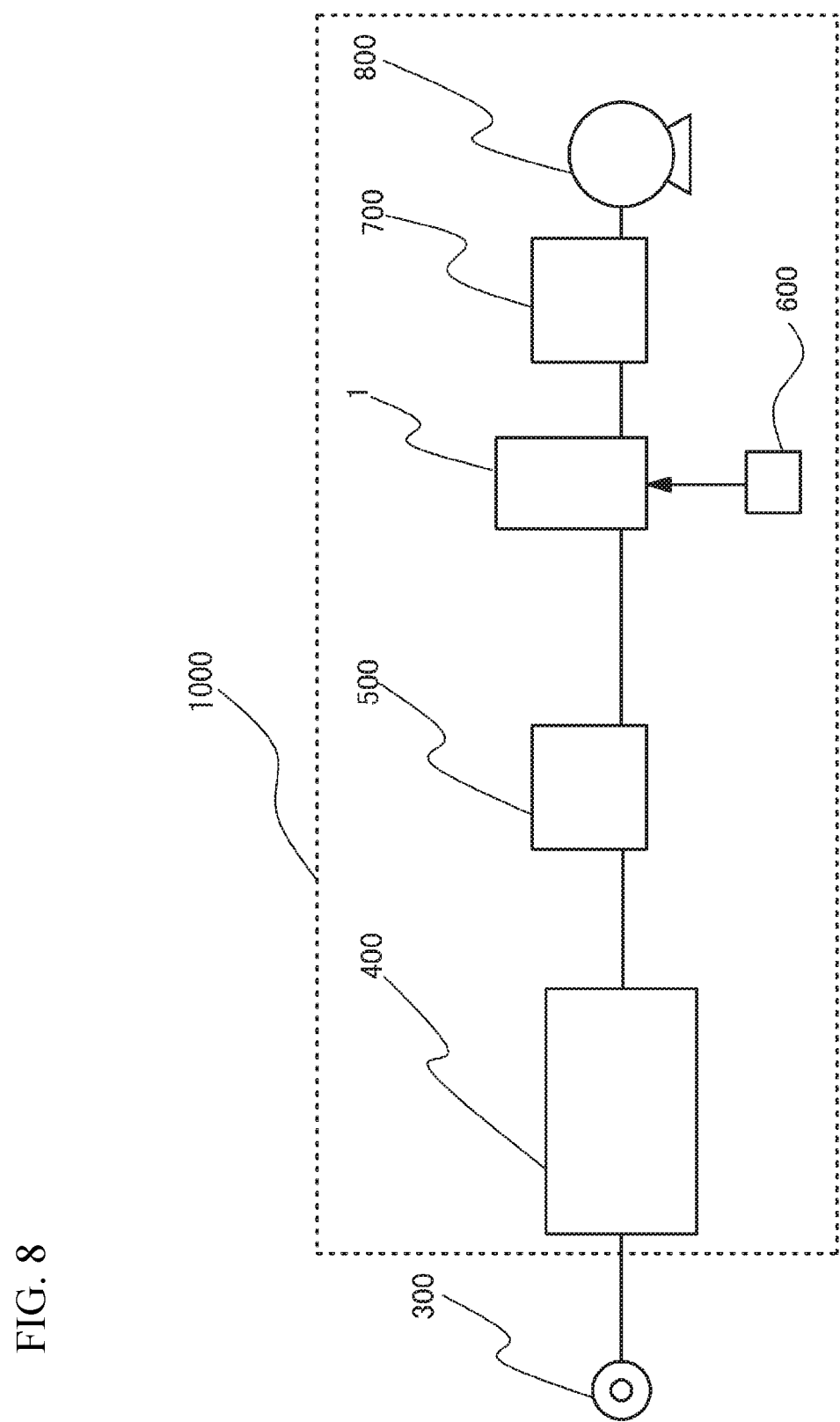
FIG. 8 is a schematic drawing illustrating an application example of the valve device according to an embodiment of the present invention to a semiconductor manufacturing process.

A semiconductor manufacturing system 1000 illustrated in FIG. 8 is a system for executing a semiconductor manufacturing process by ALD method, with 300 denoting a process gas supply source, 400 denoting a gas box, 500 denoting a tank, 600 denoting a control unit, 700 denoting a processing chamber, and 800 denoting an exhaust pump.

In the semiconductor manufacturing process based on the ALD method, the flow rate of the process gas needs to be precisely adjusted and a certain amount of flow rate needs to be secured by increasing a size of a diameter of the substrate.

The gas box 400 is an integrated gas system (a fluid control system) in which various fluid control devices, such as a switch valve, a regulator, and a mass flow controller, are integrated and housed in a box to supply an accurately measured process gas to the processing chamber 700.

The tank 500 functions as a buffer for temporarily storing the process gas supplied from the gas box 400.

The control unit 600 controls the supply of the operation gas G to the valve device 1, and the flow adjustment by the piezoelectric actuator 100.

The processing chamber 700 provides a sealed treatment space for forming a film on the substrate by the ALD method.

The exhaust pump 800 draws a vacuum inside the processing chamber 700.

According to such a system configuration as described above, initial adjustment of the process gas is possible when an instruction for flow adjustment is sent from the control unit 600 to the valve device 1.

Further, even when a film formation process is being executed in the processing chamber 700, flow adjustment of the process gas is possible, allowing optimization of the process gas flow rate in real-time.

While a case where the valve device 1 is used in a semiconductor manufacturing process based on the ALD method is illustrated in the above-described application example, the present invention is not necessarily limited thereto, and can be applied to various targets that require precise flow adjustment, such as an atomic layer etching (ALE) method, for example.

While a piston built into a cylinder chamber activated by gas pressure is used as the main actuator in the above-described embodiment, the present invention is not necessarily limited thereto, and optimal actuators can be variously selected in accordance with the control target.

While a piezoelectric actuator is used as the adjusting actuator in the above-described embodiment, the present invention is not necessarily limited thereto, and various actuators can be adopted, including a mechanism such as a motor such as a stepping motor, a ball screw that coverts rotational movement to linear movement, and a nut; a solenoid coil; and a thermo-actuator that expands and retracts by temperature changes, or the like. Note that the piezoelectric actuator 100 is preferably used as the adjusting actuator of the invention of the present application from the viewpoint that the piezoelectric actuator 100 has minimal heat emission, has heat resistance of a hundred and several dozen degrees Celsius, can be activated not only during initial adjustment, but also continually during fluid control, has minimal non-linear characteristics, such as backlash during expansion and contraction and thus an extremely high positioning accuracy, and can support a relatively large compressive load. Further, when the open position OP of the operation member 40 is precisely mechanically adjusted in advance by the adjustment body 70, a maximum stroke of the piezoelectric actuator 100 can be minimized to the extent possible (the piezoelectric actuator can be miniaturized) and high-precision fine adjustment and high-precision position control of the position of the operation member 40 are made possible by making the piezoelectric actuator 100 perform subsequent high-precision control of the position of the operation member 40.

While a so-called normally closed type valve is given as an example in the above-described embodiment, the present invention is not necessarily limited thereto and can be applied to a normally open type valve as well. In this case, for example, the degree of opening of the valve element may be adjusted by using the adjusting actuator.

While, in the configuration of the above-described embodiment, a force that acts on the operation member 40 is supported (received) by the piezoelectric actuator 100, the present invention is not necessarily limited thereto, and a configuration in which the positioning of the open position OP of the operation member 40 is executed mechanically, and only the position adjustment of the operation member 40 in the opening and closing directions is executed by the adjusting actuator without supporting the force that acts on the operation member 40, is possible.

While the diaphragm is illustrated as the valve element in the above-described embodiment, the present invention is not necessarily limited thereto, and other types of valve elements can also be adopted.

While, in the configuration of the above-described embodiment, the valve device 1 is disposed outside the gas box 400 serving as a fluid control system, the valve device 1 of the above-described embodiment can also be included in a fluid control system in which various fluid devices, such as a switch valve, a regulator, and a mass flow controller, are integrated and housed in a box.

DESCRIPTIONS OF REFERENCE NUMERALS

1 Valve device
10 Valve body
15 Valve seat
20 Diaphragm
25 Pressing adapter
30 Bonnet
38 Diaphragm presser
40 Operation member
40t Contact surface
45 Flange part
48 Closing part
50 Casing
60 Main actuator
61, 62 Piston
63 Bulkhead
70, 70A Adjustment body
71 Flow channel
80 Actuator presser
81 Flow channel
90 Coil spring
100 Piezoelectric actuator (Adjusting actuator)
101 Case main body
102 Tip portion
103 Base end portion
105 Wiring
110 Actuator receiver
110t Regulating surface
120 Disc spring (Elastic member)
150 Pipe joint
160 Pipe
180 Lock nut
300 Process gas supply source
400 Gas box
500 Tank
600 Control unit
700 Processing chamber
800 Exhaust pump
1000 Semiconductor manufacturing system
A1 Opening direction
A2 Closing direction
C1, C2 Cylinder chamber
Ch Flow channel
SP Space
OP Open position
CP Closed position
OR O-ring
G Operation gas
Lf Lift amount before adjustment
Lf+, Lf− Lift amount after adjustment

What is claimed is:
1. A valve device comprising:
a valve body that defines a flow path;
a valve element capable of opening and closing a flow path of the valve body;

an operation member that operates the valve element and is moveably provided between a closed position where the valve element closes the flow path and an open position where the valve element opens the flow path in opening and closing directions that allow the valve element to open and close the flow path;

a main actuator that moves the operation member to the open position or the closed position; and an adjusting actuator for adjusting a position of the operation member positioned in the open position, wherein the adjusting actuator is a piezoelectric actuator that includes piezoelectric elements, a length of the adjusting actuator is contracted and expanded when an electric power is applied to the piezoelectric elements, and the adjusting actuator has a base end portion always fixed with respect to the valve body during operation of the valve device.

2. The valve device according to claim 1, wherein:

the main actuator moves the operation member to the open position; and the adjusting actuator adjusts the position of the operation member, that has been positioned in the open position by the main actuator, in the opening and closing directions.

3. The valve device according to claim 2, wherein the adjusting actuator is disposed in a predetermined position with respect to the valve body, and adjusts the position of the operation member, that has reached the open position, in the opening and closing directions while receiving a force acting on the operation member at a tip portion of the adjusting actuator to regulate the movement of the operation member.

4. The valve device according to claim 3, wherein the adjusting actuator adjusts the position of the operation member in the opening and closing directions by expansion and contraction of a total length from the tip portion to a base end portion in the opening and closing directions.

5. The valve device according to claim 3, further comprising an elastic member that continually presses the adjusting actuator toward the predetermined position, interposed between the operation member and the adjusting actuator.

6. The valve device according to claim 1, wherein:

the operation member has substantially cylindrical shape closed on a lower end side by a closing part, and movably supported in the opening and closing directions, and the main actuator is configured to have cylinder chambers and pistons in which the operation member is moved in the opening direction.

7. The valve device according to claim 1, wherein the adjusting actuator comprises a case provided with the base end portion and a tip portion in the opening and closing directions, and the piezoelectric elements being housed in the case and stacked between the base end portion and the tip portion, and expands and contracts a total length between the base end portion and the tip portion of the case using expansion and contraction of the piezoelectric elements.

8. The valve device according to claim 1, wherein the main actuator is an actuator that uses gas pressure as a driving source.

9. The valve device according to claim 1, further comprising an adjusting body and an actuator presser which are used for regulating the position of the base end portion of the adjusting actuator with respect to the valve body, wherein the base end portion of the adjusting actuator is always fixed with respect to the valve body via the adjusting body and the actuator presser during operation of the valve device.

10. A fluid control system comprising:

a plurality of fluid devices, wherein:

the fluid devices include the valve device as defined in claim 1.

11. A semiconductor manufacturing method comprising using the valve device as defined in claim 1 for flow control of a process gas in a manufacturing process of a semiconductor device that requires a treatment process by the process gas in a sealed chamber, further comprising moving the operation member to the open position or the closed position, and actuating the adjusting actuator to adjust a position of the operation member positioned in the open position.

12. A semiconductor manufacturing system comprising the valve device as defined in claim 1 for control of a process gas in a manufacturing process of a semiconductor device that requires a treatment process by the process gas in a sealed chamber.

13. A flow control method for adjusting a flow rate of a fluid using the valve device as defined in claim 1, further comprising moving the operation member to the open position or the closed position, and actuating the adjusting actuator to adjust a position of the operation member positioned in the open position.

* * * * *